US 8,634,103 B2

(12) United States Patent
Quan et al.

(10) Patent No.: US 8,634,103 B2
(45) Date of Patent: Jan. 21, 2014

(54) PRINT IMAGE MATCHING PARAMETER EXTRACTION AND RENDERING ON DISPLAY DEVICES

(75) Inventors: Shuxue Quan, San Diego, CA (US); Kalin Atanassov, San Diego, CA (US); Xiaoyun Jiang, San Deigo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1539 days.

(21) Appl. No.: 11/761,981

(22) Filed: Jun. 12, 2007

(65) Prior Publication Data

US 2008/0309963 A1 Dec. 18, 2008

(51) Int. Cl.
*G06F 15/00* (2006.01)
*G06F 3/12* (2006.01)
*G06K 1/00* (2006.01)
*G06K 9/40* (2006.01)
*G03F 3/08* (2006.01)

(52) U.S. Cl.
USPC ............ 358/1.6; 358/1.9; 358/1.15; 358/518; 382/254

(58) Field of Classification Search
USPC ......... 358/1.15, 1.9, 501, 516, 518–523, 448, 358/474, 452, 1.13, 1.6, 2.1, 3.21, 3.23, 358/3.24, 461, 500, 530, 534, 537, 538, 358/305; 382/162–173, 254–275
See application file for complete search history.

(56) References Cited

U.S. PATENT DOCUMENTS

| | | | |
|---|---|---|---|
| 7,081,918 B2* | 7/2006 | Takemoto | 348/223.1 |
| 7,181,091 B2* | 2/2007 | Yoda | 382/309 |
| 7,327,875 B2* | 2/2008 | Sawada | 382/162 |
| 7,428,082 B2* | 9/2008 | Nakajima | 358/474 |
| 7,636,473 B2* | 12/2009 | Imai et al. | 382/167 |
| 7,683,973 B2* | 3/2010 | Fukuda | 348/650 |
| 7,724,977 B2* | 5/2010 | Liege et al. | 382/254 |
| 2004/0239955 A1* | 12/2004 | Uchida et al. | 358/1.1 |
| 2005/0207644 A1* | 9/2005 | Kitagawara et al. | 382/167 |
| 2005/0243347 A1* | 11/2005 | Hayaishi | 358/1.9 |

OTHER PUBLICATIONS

International Search Report—PCT/US08/066451—International Search Authority, European Patent Office—Oct. 9, 2008.
Written Opinion—PCT/US08/066451—Internationai Search Authority: European Patent Office—Oct. 9, 2008.
"Better prints from digital cameras with Print Image Matching," [Online ]Aug. 1, 2001, XP002497437 Retrieved from the Internat: URL:http://web.archive.org/web/20061121180044/www.printimagematching.com/pdf/what_is_pim/pim_wp.pdf.
"Print image matching II white paper," [Online ]Nov. 12, 2006. XP002497438, Retrieved from the Internet: URL: http://web.archive.org/web/20061121180044/www.printimagematching.com/pdf/what_is_pim/pim_wp.pdf.
European Search Report—EP08006435—Search Authority, The Hague—Sep. 29, 2008.
Written Opinion—EP08006435—Search Authority. The Hague—Oct. 9, 2008.

* cited by examiner

*Primary Examiner* — Twyler Haskins
*Assistant Examiner* — Jonathan Beckley
(74) *Attorney, Agent, or Firm* — James R. Gambale, Jr.

(57) ABSTRACT

Techniques are described for automatic print image matching (PIM) parameter extraction. An original image is captured and PIM parameter data is extracted automatically based on specifics of the original image. At least one automated PIM parameter is calculated automatically from the PIM parameter data. At least one automated PIM parameter is inserted in PIM header information for communication to a rendering device to modify the original image when rendered.

46 Claims, 16 Drawing Sheets

| PIM PARAMETRS MODULE 28 |
|---|
| GAMMA VALUE SETTING<br>RELEASING RGB CLIPPING<br>COLOR SPACE SETTING<br>SHADOW POINT SETTING<br>HIGHLIGHT POINT SETTING<br>CONTRAST SETTING<br>BRIGHTNESS SETTING<br>RGB COLOR BALANCE SETTING<br>SATURATION SETTING<br>SHARPNESS SETTING<br>MEMORY COLOR CORRECTION SETTING<br>HSB (HUE, SATURATION, BRIGHTNESS)<br>      CORRECTION SETTING<br>TONE CURVE SETTING<br>CHANNEL MIX SETTING |

FIG. 5

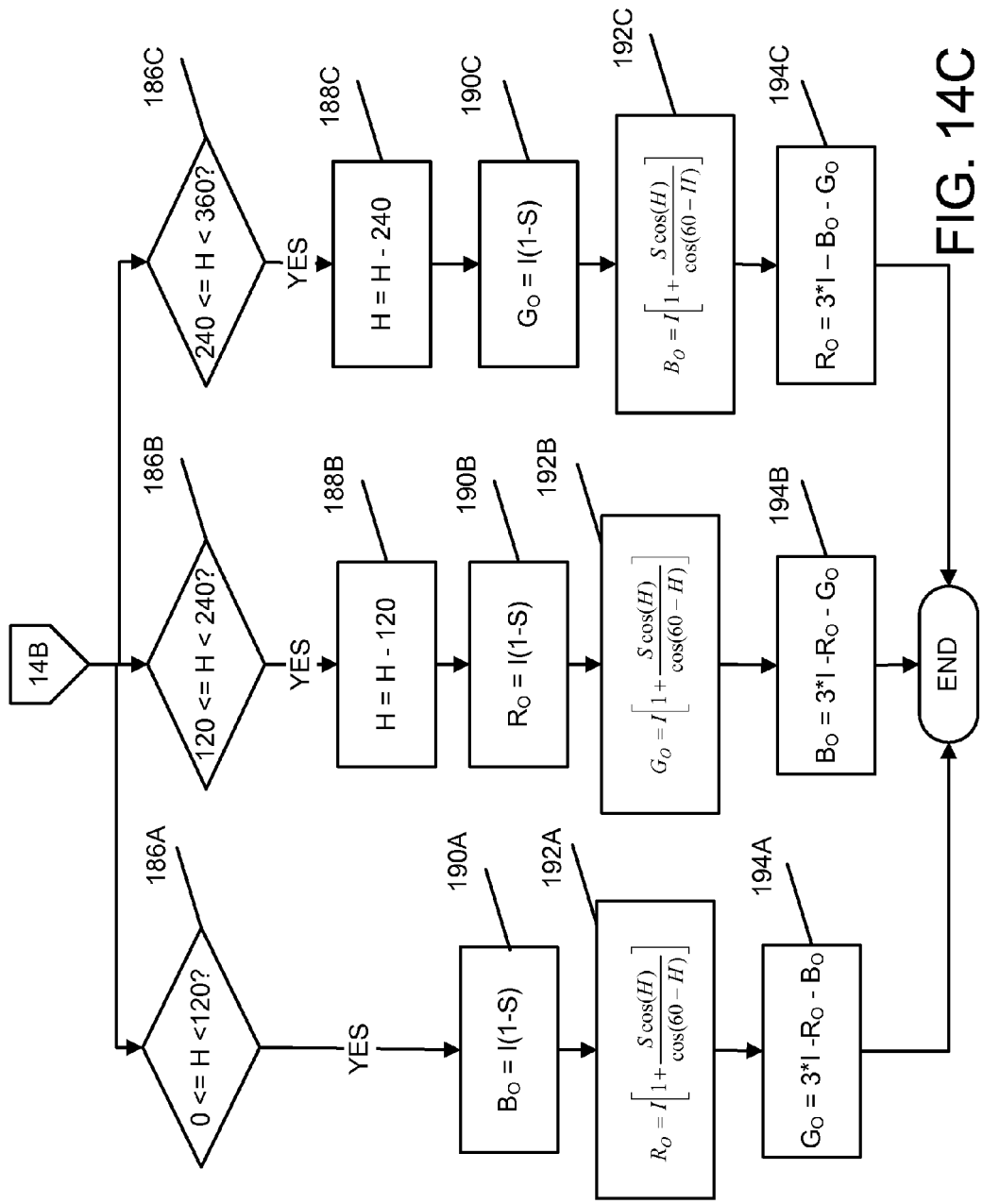

PRINT IMAGE MATCHING PARAMETER EXTRACTION AND RENDERING ON DISPLAY DEVICES

BACKGROUND

I. Field

The present disclosure relates generally to imaging rendering, and more specifically to techniques for automatically extracting print image matching (PIM) parameters that can be automatically adjusted to produce a better looking (visually enhanced) image.

II. Background

Referring to FIGS. 1A and 1B, the gamut curve for a typical color gamut is denoted as 2 and has a generally horseshoe shape. The horseshoe shaped gamut curve 2 represents the entire range of possible colors. Overlaid in the horseshoe shaped gamut curve 2 is the gamut curve denoted as 4 for an image taken by a digital still camera image. The gamut curve denoted as 6A is for a standard red, green blue (sRGB) display device, such as a CRT or other typical computer monitor, and has a generally triangular shape. The corners of the triangle represent the primary colors red (R), green (G) and blue (B) of the gamut. In FIG. 1B, in lieu of the gamut curve 6A, a gamut curve denoted as 6B is overlaid which is the gamut curve for an EPSON® 6-color inkjet printer.

As can be readily seen, the color gamut is device-dependent. A digital still camera device may be able to capture more colors than what a sRGB display device can render. Moreover, a multi-ink printing device has a wider color gamut than the sRGB display.

Print Image Matching (hereinafter, PIM) is technology introduced by EPSON® to allow a camera/user to specify settings that are later used by the printer to process an image at print time. The PIM technology enables conveying the image "as captured" to the printer along with control information used to instruct the printer to perform certain operations. The PIM technology creates information outside of the visible color space of a sRGB display that could be used to print on a printer's wider color space. The PIM technology also provides active control of image print quality by a camera's manufacturer or user.

For example, PIM technology allows a camera's subsystem to correct for light/color imbalances occurring at the time of taking a picture without processing the image; the parameters for processing the image are included in the EXIF header (PIM tag) and are later used by the printer to apply picture specific processing. The camera user can also potentially specify types of pictures (i.e., portrait, landscape scenery, etc.) which can be interpreted by the camera subsystem information PIM parameters. The PIM technology supports multiple parameters with often overlapping scope.

An image with the PIM correction ON is corrected for light/color imbalances when rendered on or by a display device. The same image with the PIM correction OFF may appear lighter or darker due to light/color imbalances. Specifically, the PIM parameters are used to make the image more balanced. For example if the image is too bright, the PIM parameters can make the image darker. However, if the image is too dark, the PIM parameters can make the image brighter.

However, the ease of use of PIM parameters has generally been unacceptable.

SUMMARY

Techniques to automatically extract PIM parameters that can be automatically adjusted to produce a better looking (visually enhanced) image are described herein. In an embodiment, a system is disclosed comprising an image capturing device operable to capture an original image and extract PIM parameter data automatically based on specifics of the original image. The system includes a rendering device which is PIM-enabled. Furthermore, the system has a processor operable to calculate automatically at least one automated PIM parameter from the PIM parameter data. The processor also inserts the at least one automated PIM parameter in PIM header information for communication to the rendering device to modify the original image when rendered.

In another embodiment, an apparatus is disclosed which comprises a processor operable to calculate automatically at least one automated PIM parameter based on automatically extracted PIM parameter data based on specifics of an original image. The processor also inserts the at least one automated PIM parameter in PIM header information for communication to a PIM-enabled rendering device to modify the original image when rendered. The apparatus also includes memory coupled to the processor.

A further aspect includes a wireless device comprising an image capturing module operable to capture an original image. The device also include a processor operable to automatically extract PIM parameter data automatically based on specifics of the original image and insert the PIM parameter data in a header slot of a header appended to the original image. The device creates an image data file with the header and the original image for communications. A communication module of the device communicates the image data file, the image data file being used to calculate automatically at least one automated PIM parameter.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 5 illustrates a list of PIM parameters in the PIM parameters module.

FIGS. 14A-14C illustrate a flowchart for a memory color saturation process.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1B:
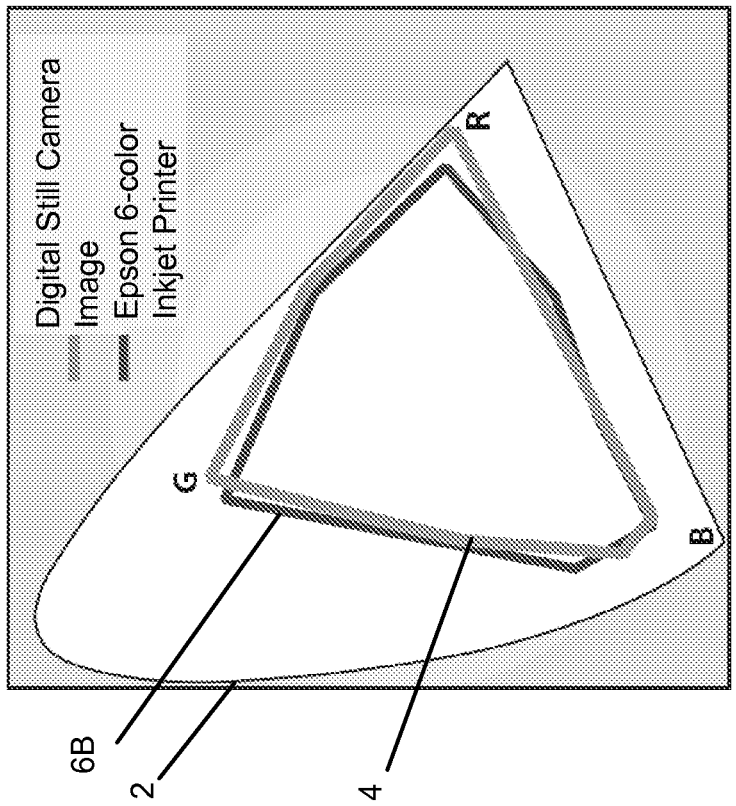
FIG. 1B shows gamut curves for a typical color gamut, an Epson 6-color inkjet printer and a digital still camera.
Figure 1A:
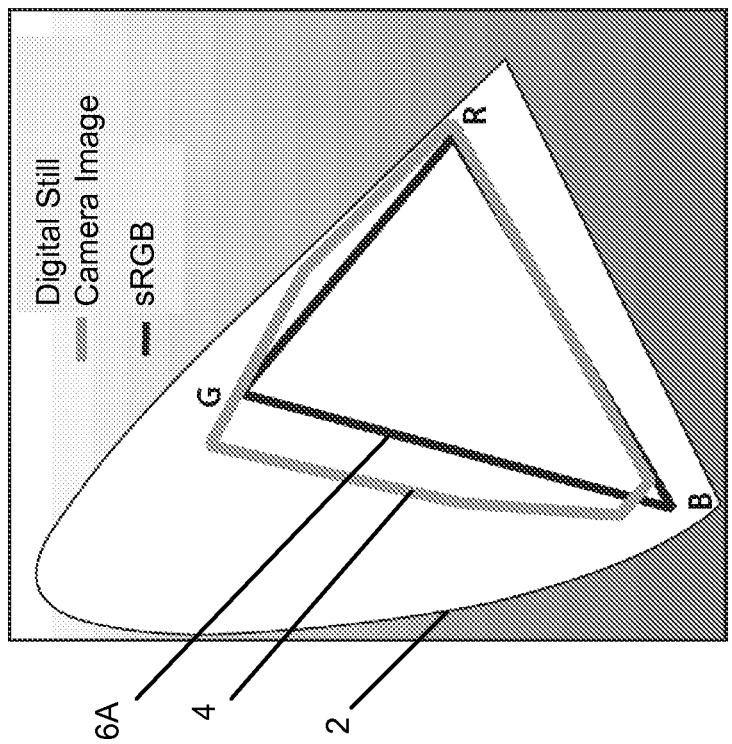
FIG. 1A shows gamut curves for a typical color gamut, a standard RGB display and a digital still camera.
Figure 2:
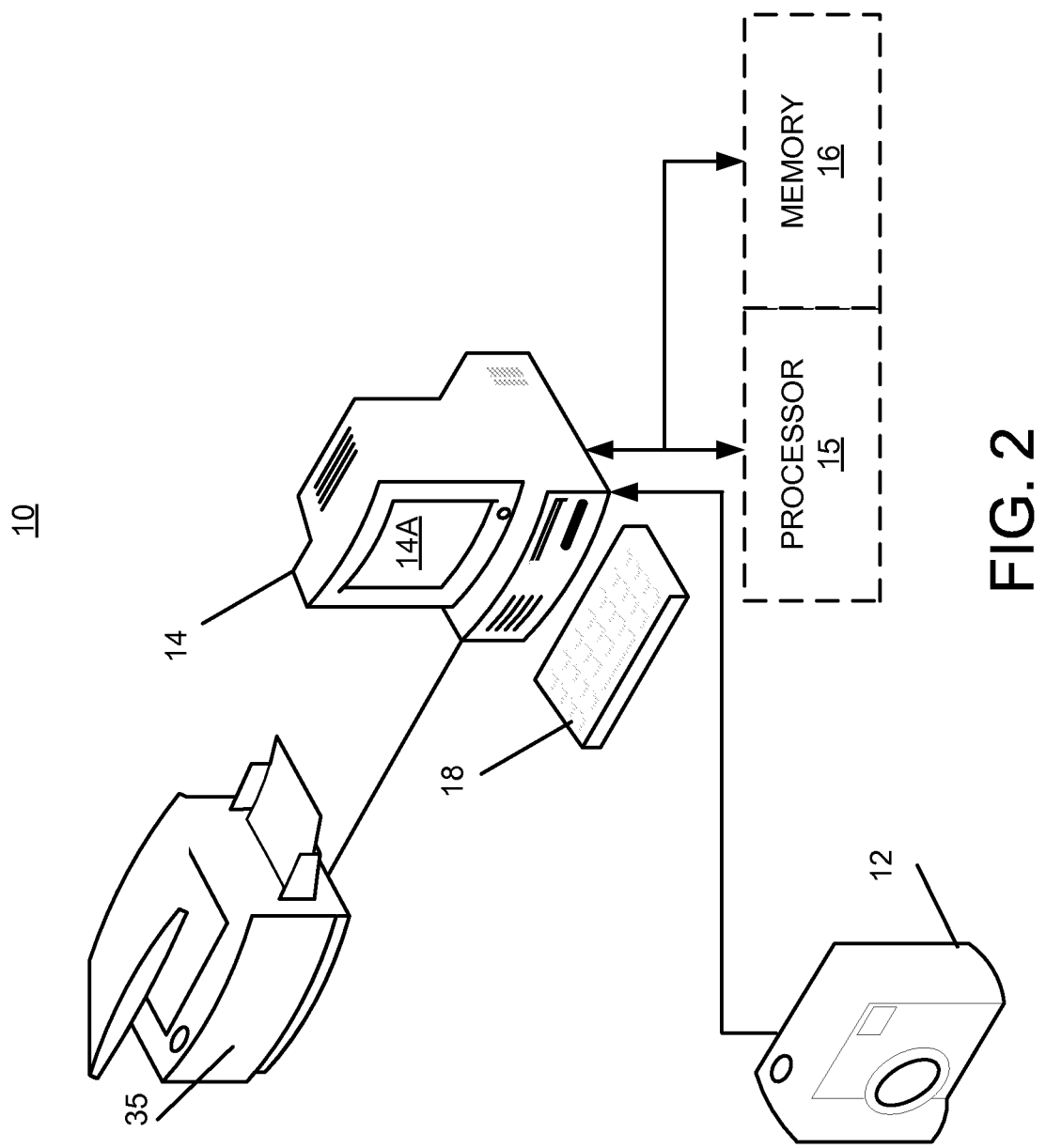
FIG. 2 illustrates a general diagram of a system for automatic PIM parameter extraction and rendering on a display device wherein the image is captured by a image capturing device.

Referring now to the drawings in detail, and more specifically to FIG. 2, an exemplary system, generally designated at 10, for automatic PIM parameters extraction and rendering on a display device is shown. The system 10 includes an apparatus in the form of a computer 14 with a display 14A, such as a CRT, LCD, etc., a processor 15 and memory 16 (shown in phantom), and keyboard 18. In lieu of or in addition to the keyboard 18, other data input and/or computer navigational devices such as a mouse, voice-responsive assemblies may be included. The computer 14 is coupled via a wire or wireless connection to an image capturing device 12 and a printing device 35. In the exemplary embodiment, the printing device 35 is a PIM-enabled printing device 35. Additionally, the memory 16 includes machine readable medium for storing program instructions therein. The apparatus is not limited to the computer 14, but may be any other type of general purpose computing device.

Figure 3:
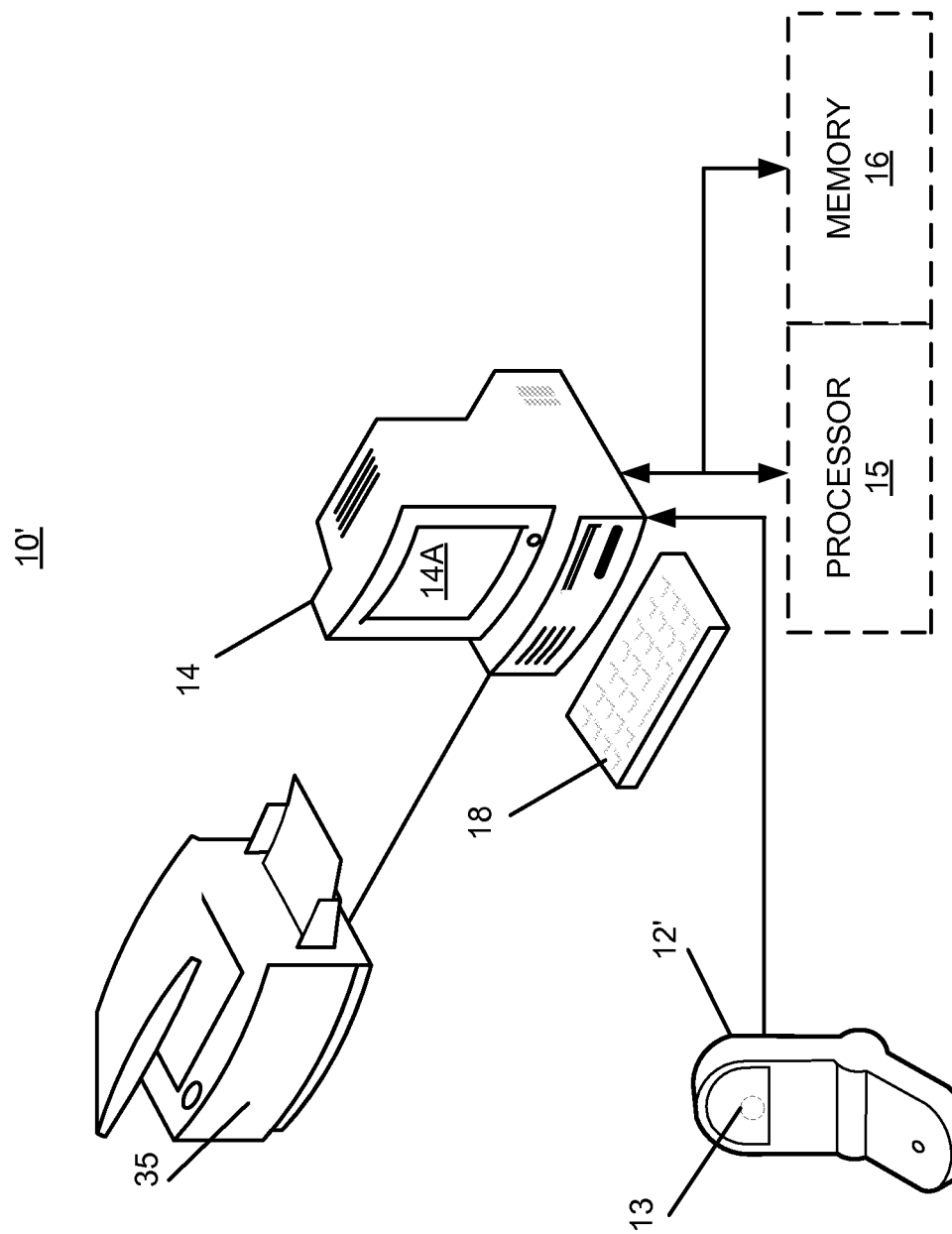
FIG. 3 illustrates a general diagram of a system for automatic PIM parameter extraction and rendering on a display device wherein the image is captured by a camera wireless phone device with still imaging capturing or video capability.

FIG. 3 illustrates a system, generally designated at 10', for automatic PIM parameters extraction and rendering on a display device using a wireless camera phone device 12'. The system 10' is essentially the same as system 10 except that in lieu of an image capturing device 12, a wireless camera phone device 12' is used.

Figure 4:
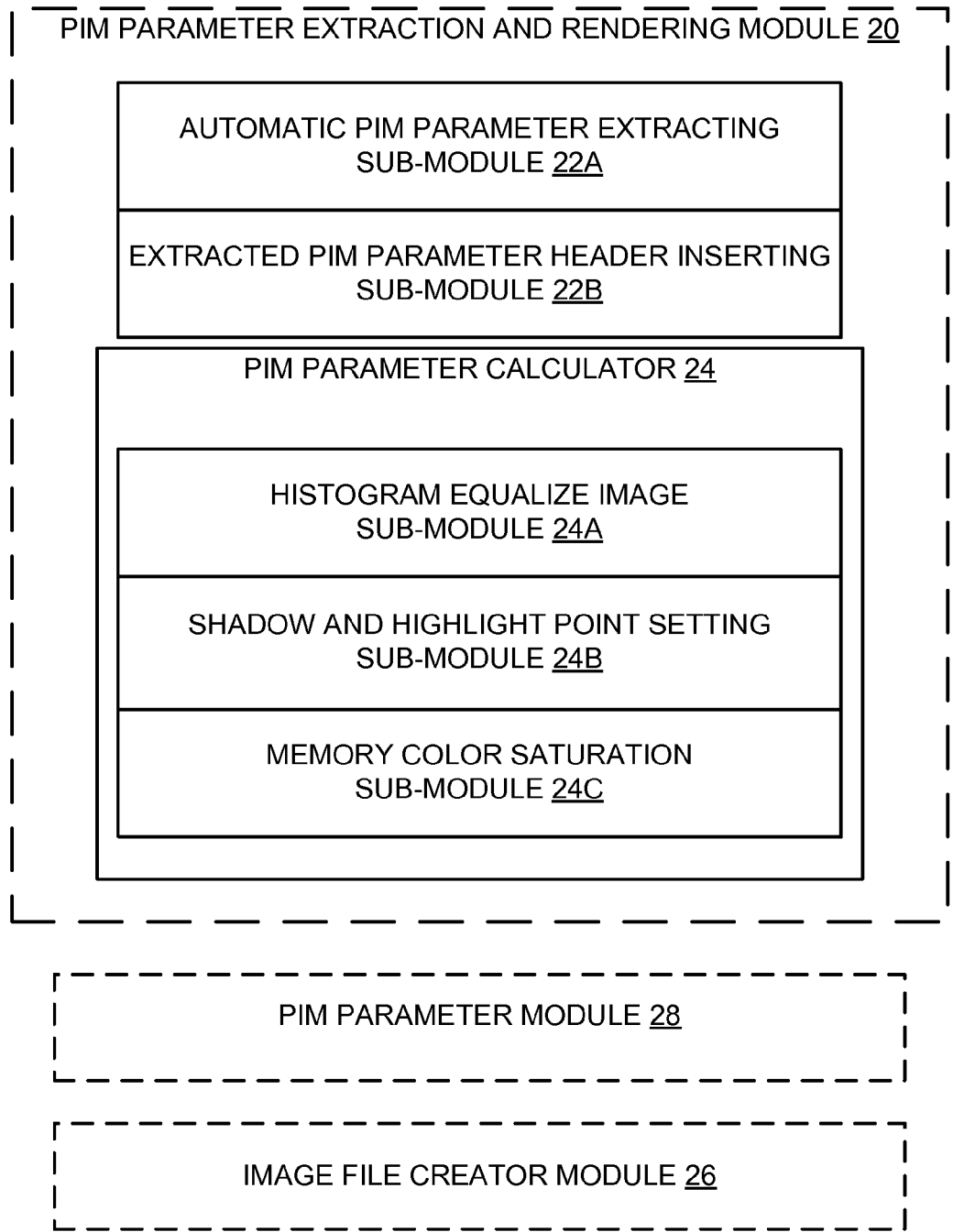
FIG. 4 illustrates a general block diagram of the automatic PIM parameter extraction and rendering.

With specific reference to FIG. 4, a PIM parameter extraction and rendering module 20 for performing the operations described herein is shown. The PIM parameter extraction and rendering module 20 includes an automatic PIM extracting sub-module 22A and an extracted PIM parameter header inserting sub-module 22B. The PIM parameter extraction and rendering module 20 further includes a PIM parameter calculator 24. The PIM parameter calculator 24 includes a histogram equalize image sub-module 24A to correct for brightness, contrast and gamma value setting. The operation (process S101) of the histogram equalize image sub-module 24A is set forth in FIGS. 12A and 12B. The shadow and highlight point setting sub-module 24B stretches the image. The operation (process S141) of the shadow and highlight point setting sub-module 24B is set forth in FIG. 13. The memory color saturation sub-module 24C saturates a plurality of colors. The operation (process S161) of the memory color saturation sub-module 24C is set forth in FIGS. 14A-14C.

The program instructions of sub-modules 22A and 22B and the program-instructions of sub-modules 24A-24C may reside on different machines. For example, the automatic PIM extracting sub-module 22A and an extracted PIM parameter header inserting sub-module 22B may reside on the image capturing device 12 or wireless camera phone device 12'. Alternately, the a histogram equalize image sub-module 24A, the shadow and highlight point setting sub-module 24B and the memory color saturation sub-module 24C may reside on computer 14. In another arrangement, if an image capturing device is coupled to or integrated with the computer 14, the entire PIM parameter extraction and rendering module 20 may reside on a single machine or computer 14.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

Returning again FIGS. 2 and 4, the PIM parameter extraction and rendering module 20 is operable to display on any of printer 35, (computer) display 14A, or display of image capturing device 12. A general overview of the operation for system 10 will now be described. First, a user takes a picture or captures a still image with the image capturing device 12. In the exemplary embodiment, the user transfers, downloads or otherwise saves the picture or still image (hereinafter referred to as "image data" in memory or a machine readable medium. The image data file will contain the actual picture or image captured plus some header information.

When the image capturing device 12 or wireless camera phone device 12' does not support PIM or in a regular mode, the captured image may be encoded, and a header is appended thereto. For example, for a still jpeg image, the jpeg format has a header with a PIM parameters slot. When PIM is not supported or in a regular mode, the PIM parameters slot is empty. However, if PIM is supported, the still jpeg image and related header is modified to include the extracted PIM parameters. The automatic PIM extracting sub-module 22A extracts data related to the PIM parameters while the extracted PIM parameter header inserting sub-module 22B inserts the extracted PIM parameters in the header information to create the image data file.

In the exemplary embodiment, the extracted PIM parameters include the PIM parameter data necessary for the histogram equalize image sub-module 24A, the shadow and highlight point setting sub-module 24B and the memory color saturation sub-module 24C to perform their operations by computer 14. After the a histogram equalize image sub-module 24A, the shadow and highlight point setting sub-module 24B and the memory color saturation sub-module 24C perform their operations to create the printers PIM parameters for rendering the image, the PIM header to printer 35 is modified to include the adjusted parameters of the a histogram equalize image sub-module 24A, the shadow and highlight point setting sub-module 24B and the memory color saturation sub-module 24C.

The printer 35 receives the original image data with a set of PIM parameters in a PIM header. The original image data is not changed or modified in any way. However, the PIM parameters in the printer header are used by the PIM-enabled printer 35 to render the original image with enhanced color and lighting balance via the PIM header.

If the printer 35 was not a PIM-enabled, the non-PIM-enabled printer prints only the original image without any modification. Furthermore, PIM parameters can be interpreted not only by printer 35 which produces a hardcopy display of the image, but by other display devices. Some special monitors may be a rendering device (which can be a printer or a monitor); display rendering is not actually seen until it is printed.

Referring now to FIGS. 3 and 4, the wireless camera phone device 12' is operable to take or capture a picture or still image (hereinafter referred to as "image data"). The wireless camera phone device 12' is also operable to send or transmit the image data. Before transmitting the image data, the wireless camera phone device 12' will encode image data and append a jpeg header to form a jpeg image file. The jpeg image file can be transmitted to different devices via wireless communications. In the exemplary embodiment, the wireless camera phone device 12' transmits the jpeg image file to computer 14.

The wireless camera phone device 12' includes the automatic PIM extracting sub-module 22A and the extracted PIM parameter header inserting sub-module 22B. When the picture or still image is taken, just before the wireless camera phone device 12' compresses the still image, certain processing is applied to the (original) still image to extract some information from the he (original) still image. Then, the header is developed. For a jpeg picture, the header is a jpeg header, but in the jpeg header there is small space reserved for PIM parameters which in the regular mode would have been empty. If the wireless camera phone device 12' includes the automatic PIM parameter extracting sub-module 22A and the extracted PIM parameter header inserting sub-module 22B, then certain PIM parameter data based on the image specifics is extracted and inserted in the jpeg header.

The image file can be sent to different places. If the image file is opened on a display 14A, it is not going to be different than the original image, the PIM parameters are not seen by regular jpeg decoders. However, if original image is printed, that is, if the original image was sent to the printer 35, usually the printer 35 will decode the image and it will print it out. If the printer does not support PIM, then the printer will just decode the mage and then print whatever is in the image (whatever was encoded) exactly as it was taken. If there is PIM information, and if the printer 35 is PIM-enabled, the printer 35 prints the image with the automatically calculated PIM parameters and other PIM parameters set by the user or device.

According to the exemplary embodiment, the original image is not modified. The original image is process to automatically note (without user or device intervention) whether the original image is too dark. While keeping the original image and knowing that the image was dark, the automatically calculated PIM parameters advise the printer to do correct the image during rendering without changing the original image.

In general, there are four elements which are not required to be connected or function as the same device. The first element is a device that generates the original image or picture. The second element extracts the PIM parameter data and inserts them in the image header. The third element automatically calculates a set of PIM parameters automatically based on the extracted PIM parameter data and creates a PIM header which includes at least the set of PIM parameters calculated. The fourth element includes the rendering device.

In the wireless camera phone device 12' application, the wireless camera phone device 12' includes both the first and second elements. In other words, the wireless camera phone device 12' includes a module for capturing a still image and includes the automatic PIM extracting sub-module 22A and the extracted PIM parameter header inserting sub-module 22B. Other image capturing devices may not include both of the first and second elements.

Figure 6:
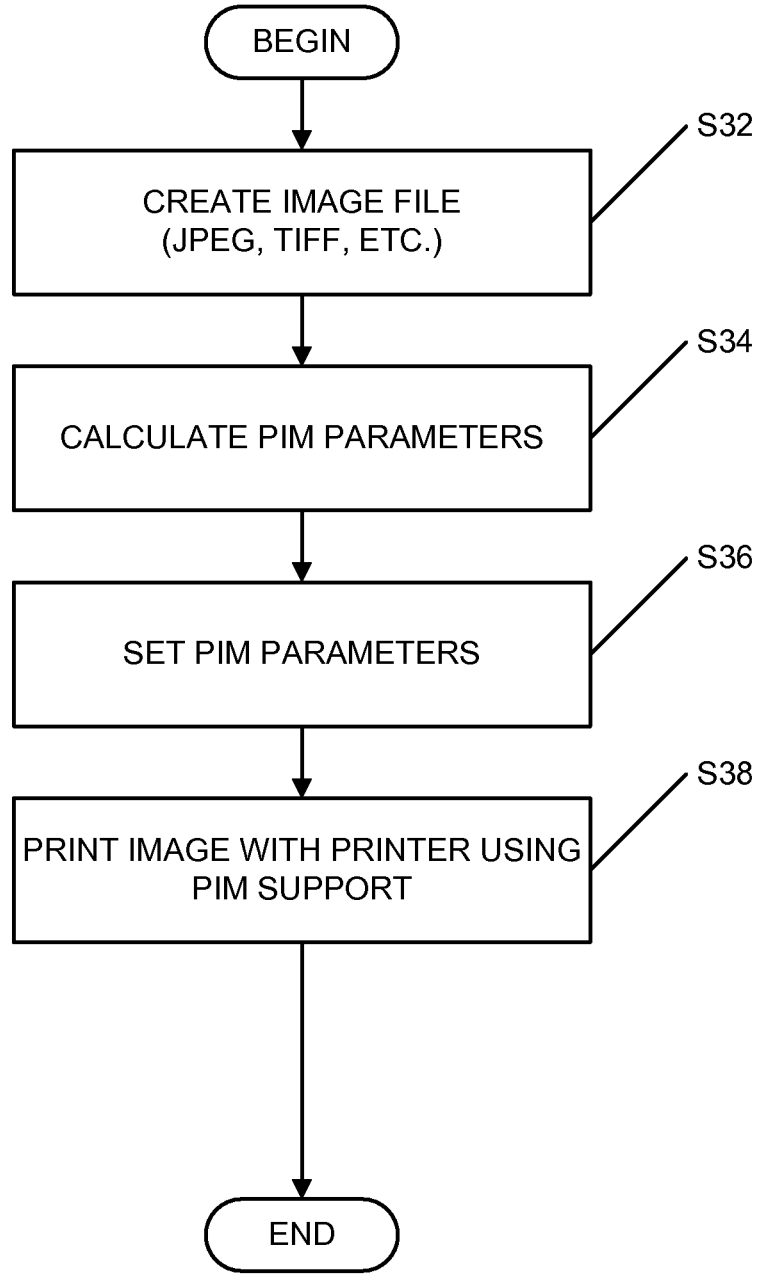
FIG. 6 illustrates the general flowchart for the PIM parameter setting method.

Referring also to FIG. 6, a parameter setting procedure 30 for system 10 is shown and begins with step S32 where an image file is created by the image file creator module 16. Examples of an image file include JPEG and TIFF formats. While only two examples of image files are provided, currently there are many other image files that can be used. The image file is created after the user shoots or captures the picture or scene with the image capturing device 12. Step S32 is followed by step S34 where the PIM parameters are calculated according to the methods described in detail below via the PIM extraction module 20. In general, the PIM extraction module 20 includes the program code or instructions executable by processor 15.

Step S34 is followed by step S36 where the PIM parameters are set. Step S36 is followed by step S38 where the image is printed using the PIM-enabled printing device 35 with PIM support.

The user can then visually inspect or perform a sensory evaluation to determine if any further adjustments are necessary using the display 14A on the computer 14. The computer 14 is shown as a personal computer having stored therein the computer program code or instructions for carrying out the automatic PIM parameter extraction method 100. The computer 14 may be a Laptop, Notebook, Tablet or other computing device with printing capability and a port for connecting to the printing device 35.

As best seen in FIG. 5, the PIM parameters module 28 includes a gamma value setting, releasing RGB clipping, color space setting, shadow point setting, highlight point setting, contrast setting, brightness setting, RGB color balance setting, saturation setting, sharpness setting, memory color correction setting, HSB (hue, saturation, brightness) correction setting, tone curve setting and channel mix setting.

Figure 7:
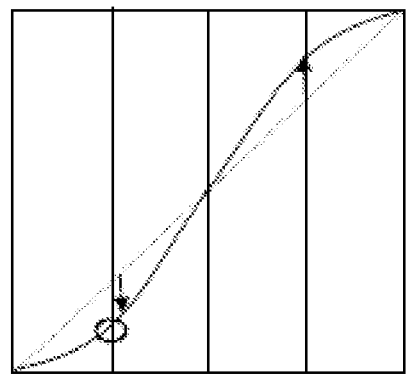
FIG. 7 illustrates a plot or curve for contrast setting.
Figure 8A:
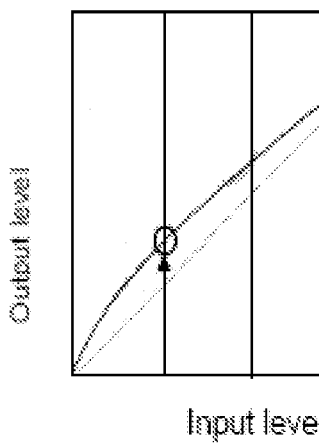
FIGS. 8A-8B illustrates plots or curves for brightness setting.
Figure 8B:
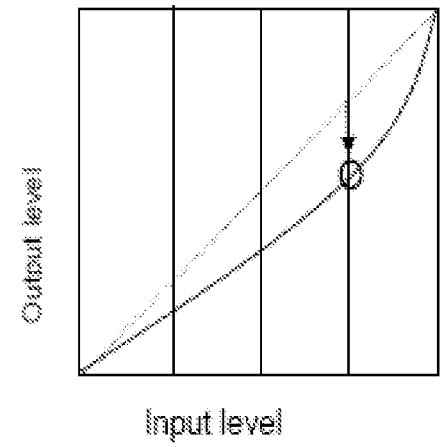
Figure 9:
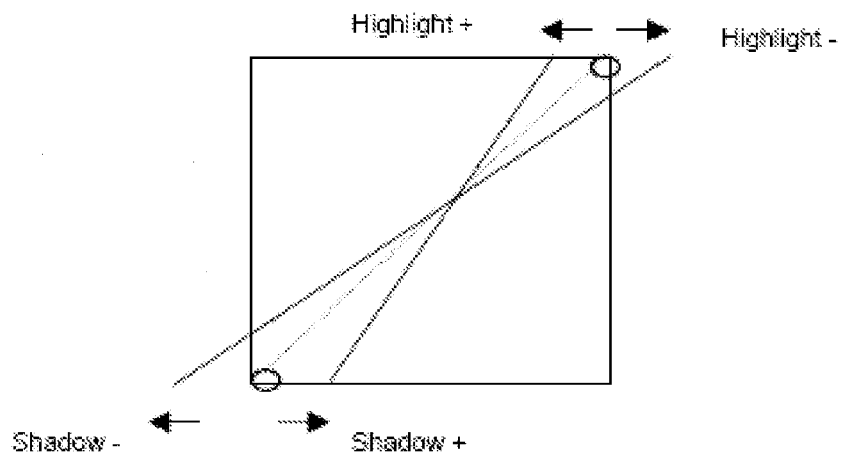
FIG. 9 illustrates a plot or curve for highlight point setting.

A plot or curve of the contrast setting is shown in FIG. 7. The contrast setting plot is shown increasing at the point of the denoted circle. In FIGS. 8A and 8B, plots or curves of the brightness setting for the output level verses the input level are shown. In the first plot (FIG. 8A), the brightness setting plot is shown increasing. In FIG. 9, plots of the highlight point setting and shadow point setting are shown. The arrows at the top indicate the direction of the highlight setting while the bottom arrows indicate the direction of the shadow setting. The memory color correction setting provides RGB offsets for green, sky blue, flesh color and red.

Automatic Parameter Extraction

Figure 10:
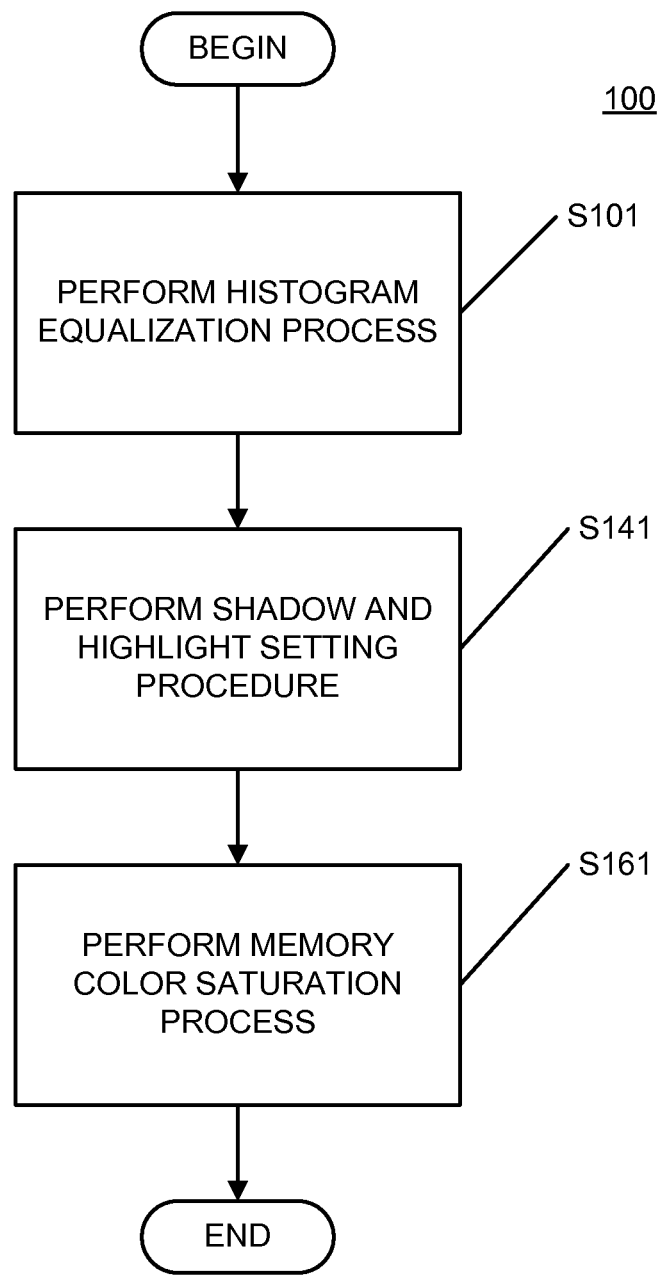
FIG. 10 illustrates a flowchart of an automatic PIM parameter extraction method.
Figure 12A:
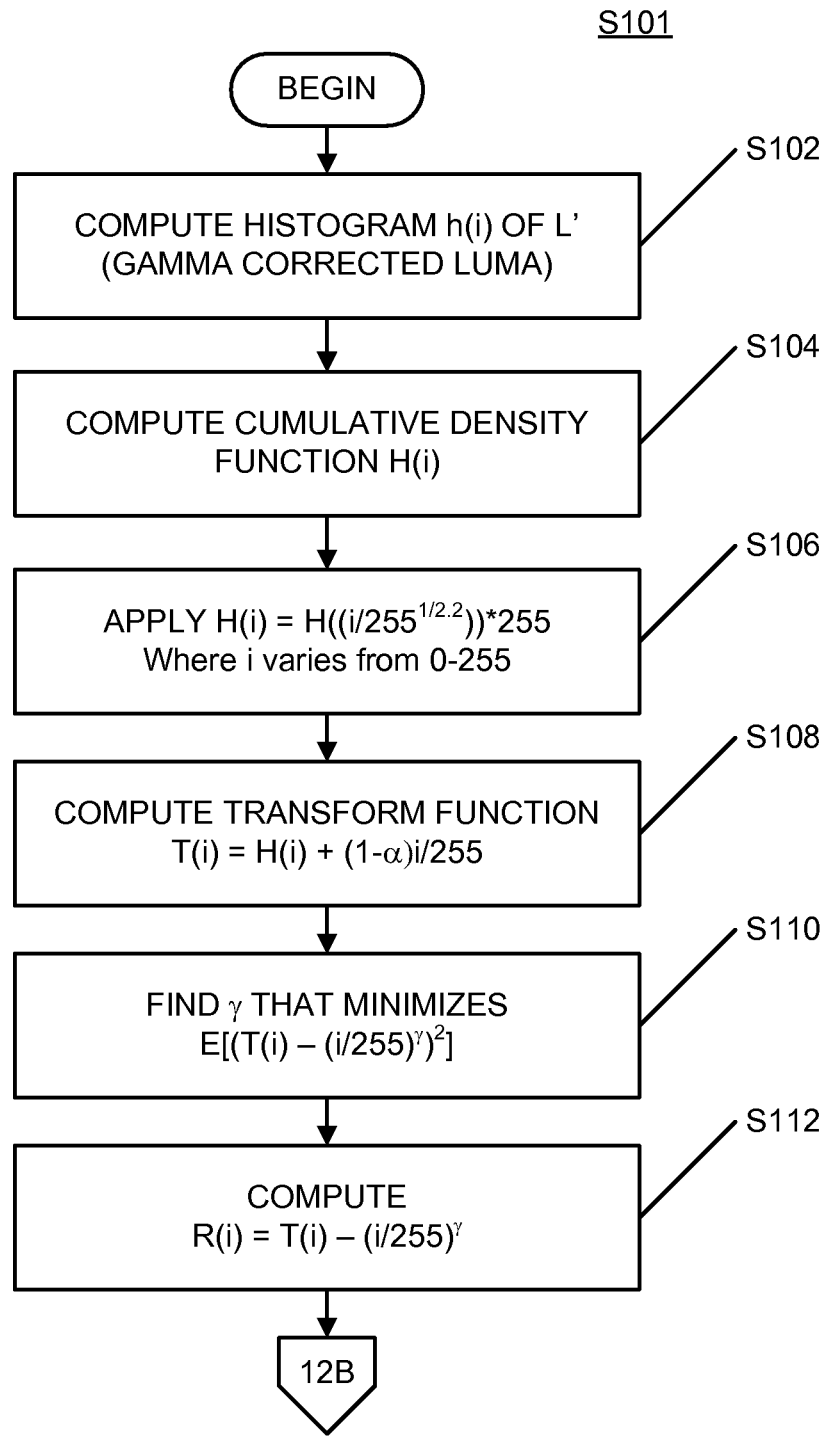
FIGS. 12A-12B illustrate a flowchart of the histogram equalization process.
Figure 12B:
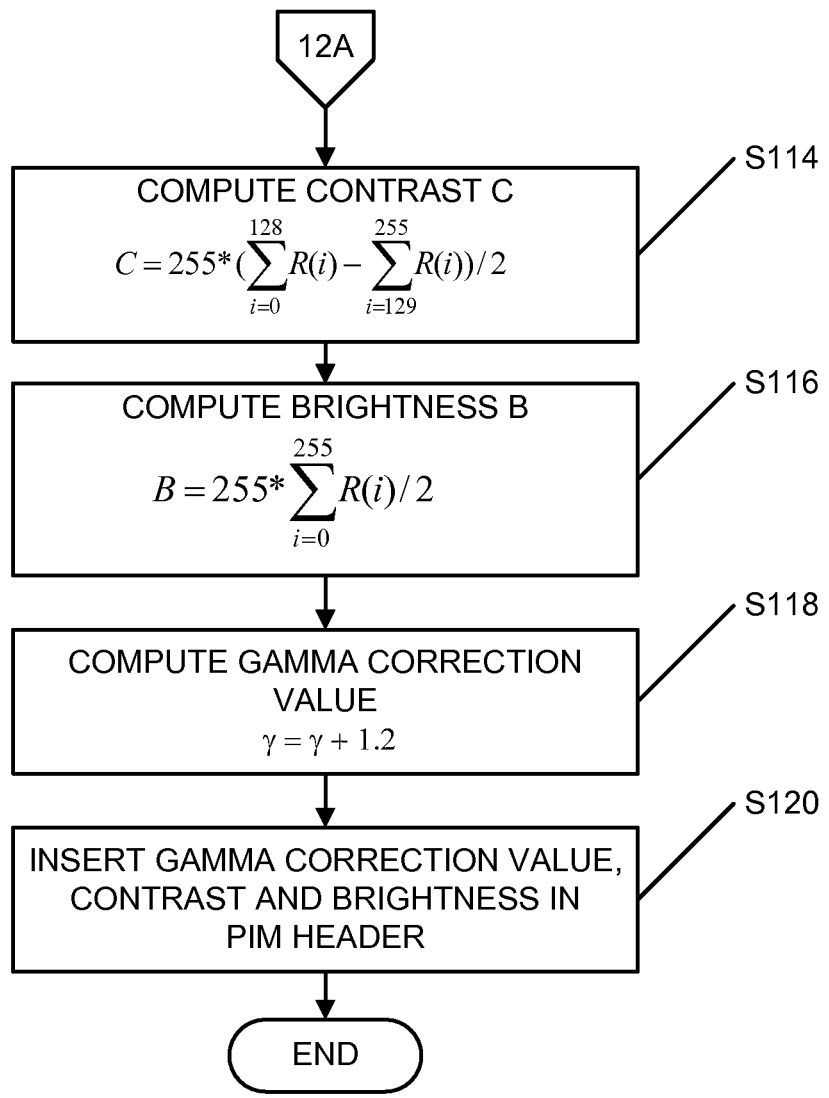
Figure 13:
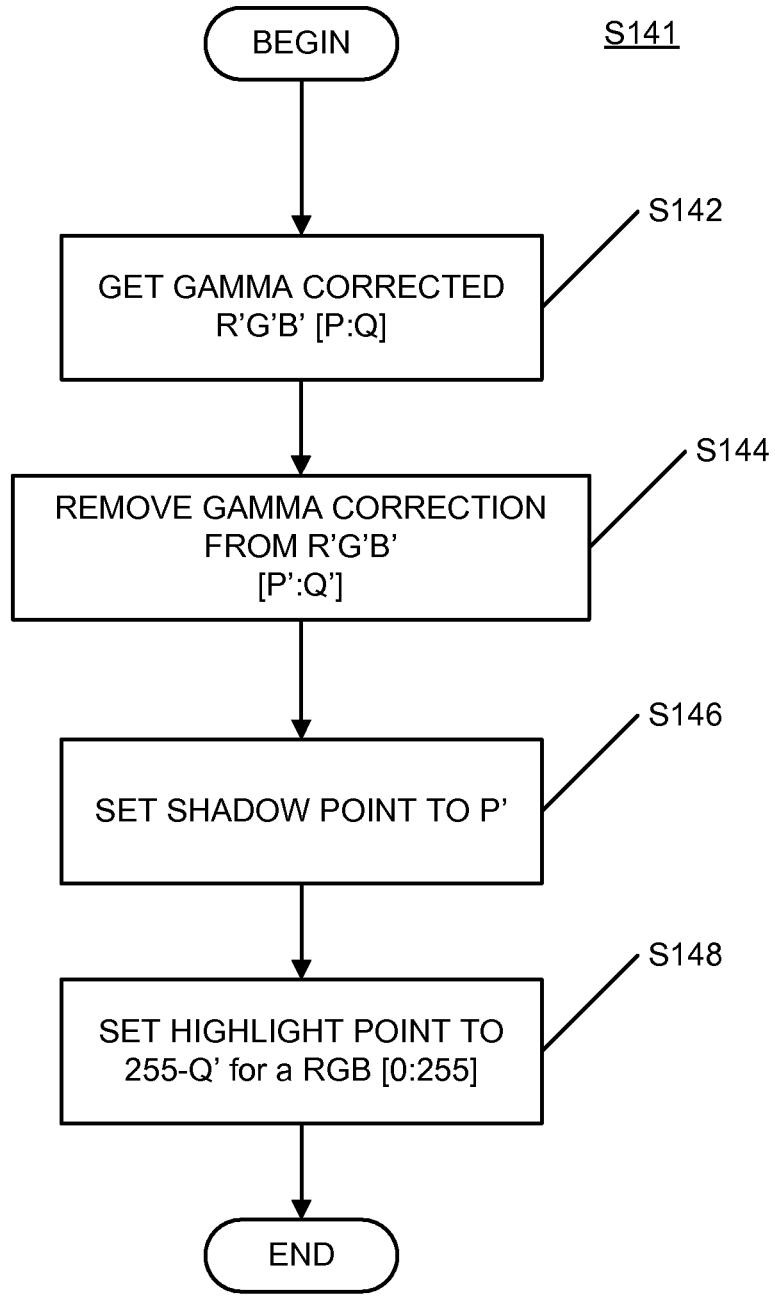
FIG. 13 illustrates a flowchart of the shadow and highlight point setting process.
Figure 14A:
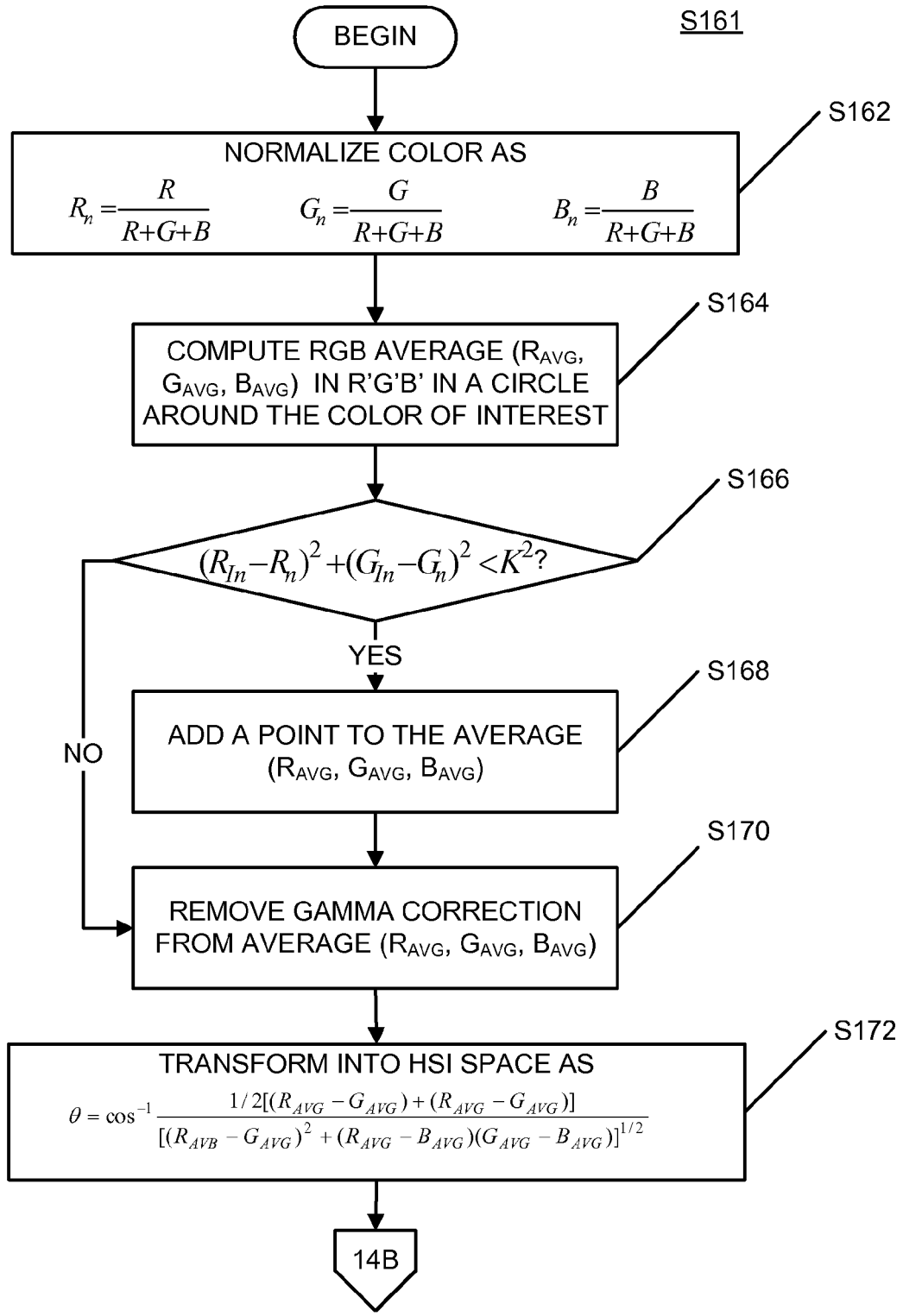
Figure 14B:
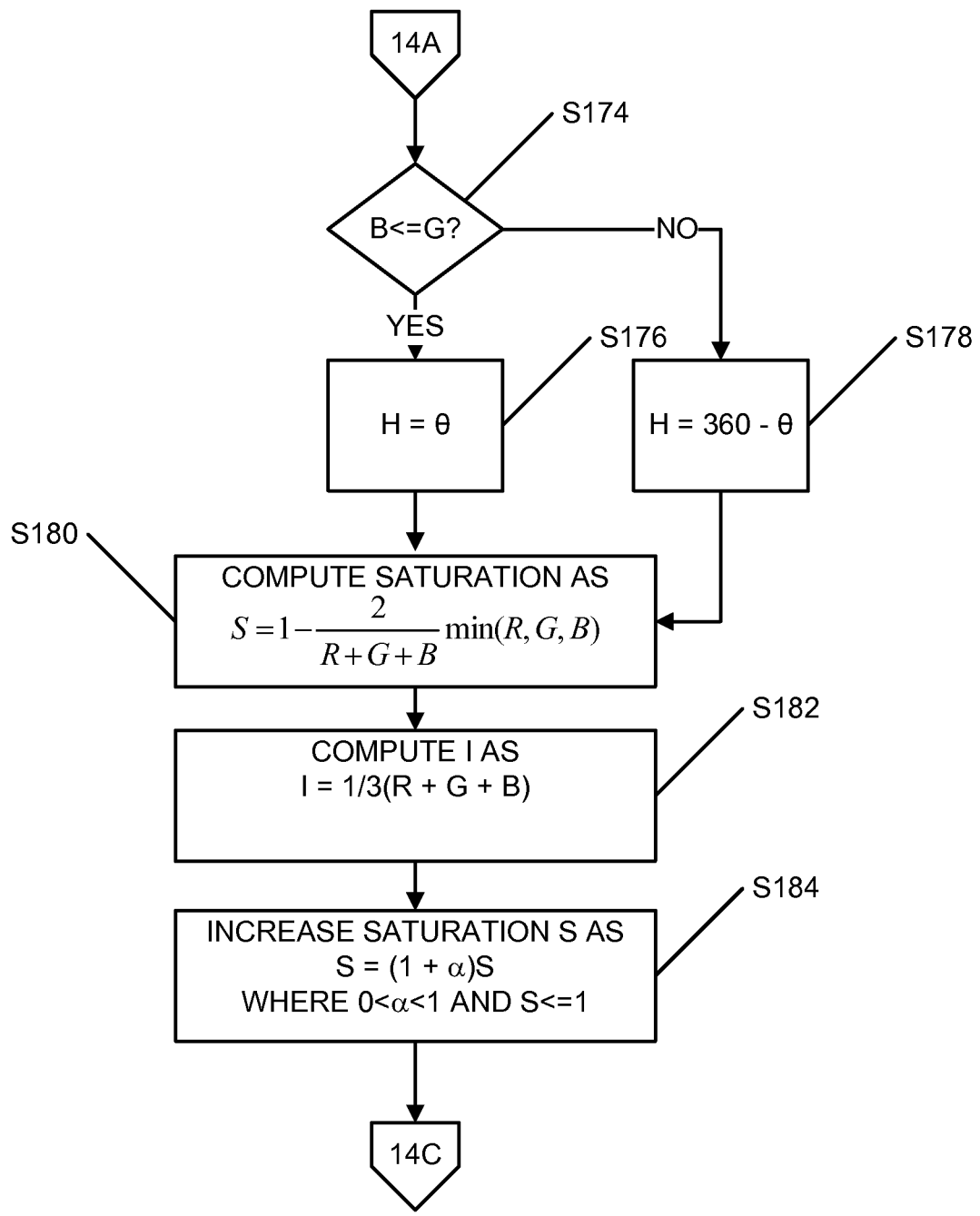

Referring now to FIG. 10, in general, the automatic PIM parameter extraction method 100, first, applies or uses the gamma value, brightness, and contrast settings to histogram equalize the image (build histogram equalization function with the three curves) via a histogram equalization process S101. An exemplary histogram equalization process S101 is shown in FIGS. 12A-12B. Second, the method 100 uses a shadow and highlight point setting process S141 to stretch the image to adjust the image in the range of 0-255. An exemplary shadow and highlight point setting process S141 is shown in FIG. 13. Third, the method 100 saturates the memory color for a plurality of colors in a memory color saturation process S161. For example, all colors except the flesh color can be saturated in the memory color saturation process S161. An exemplary memory color saturation process S161 is shown in FIGS. 14A-14C.

The method 100 analyzes an image histogram and designs a transformation which will correct some image deficiencies detectable from the histogram, i.e., too bright or too dark image. The designed transformation is then to be implemented using a selected set of PIM tools (parameters). Three PIM parameters (gamma value, contrast, and brightness) are used to construct the transformation. Those are specified in the PIM header as scalars but are expanded by the printing device 35 to full curves according to the PIM specification. Knowing the scalar-curve mapping allows for "constructing" those curves and using them to construct the desired transformation. Another parameter, sharpness, was also considered. It was concluded that the way sharpness is being defined in the PIM specification (i.e., filtering operation triggered based on exceeding a threshold value) does not represent a reasonable addition to histogram processing nor it has use for edge enhancement.

Figure 11:
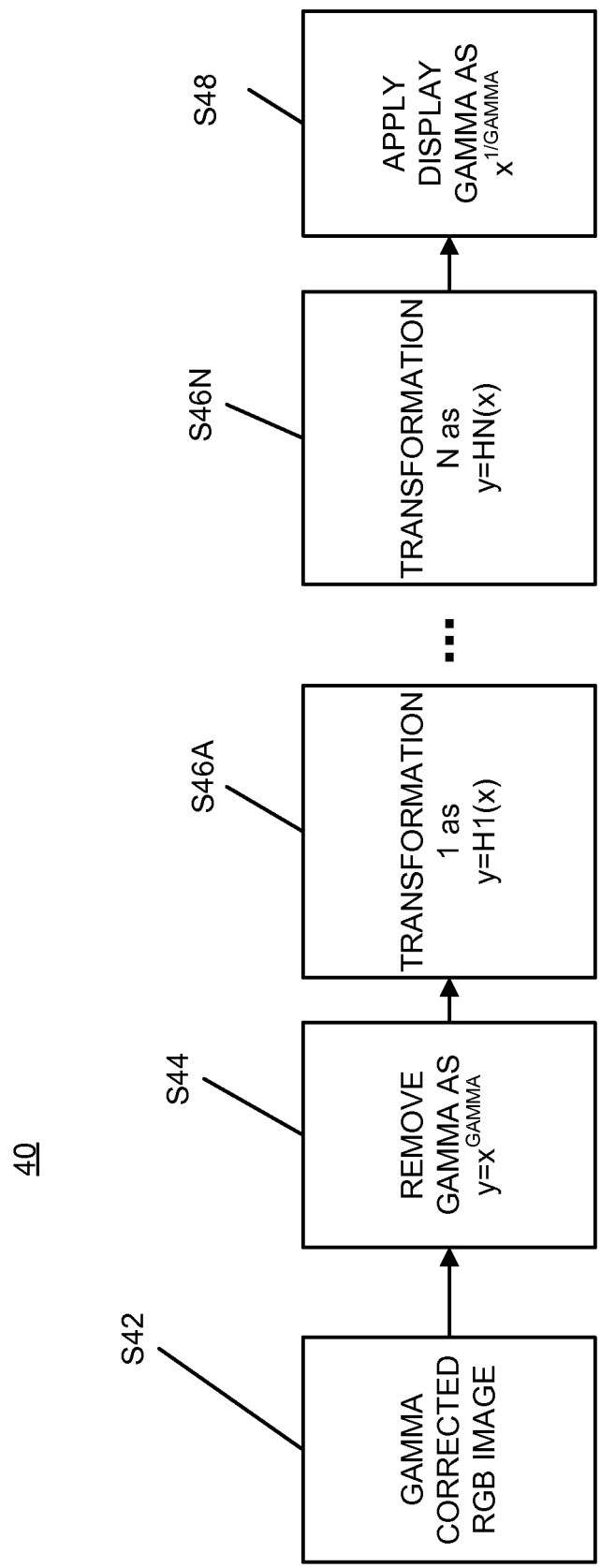
FIG. 11 illustrates a block diagram of a PIM image equalization processing process in a rendering device.

Referring now to FIG. 11, a PIM image equalization processing process 40 in a rendering device 35 such as a PIM-enabled printing device 35, is shown. The process 40 begins with a transport modified input or a gamma corrected R'G'B' image at step S42. Step S42 is followed by step S44 where the gamma having a gamma value (γ) is removed according to equation Eq.(1)

$$y = x^\gamma \quad \text{Eq.(1)}$$

where x is a source. In general, gamma correction is applied by a rendering device because the rendering device will have a certain response. The rendering device will have a modify the image. Thus, the reverse of such modification is called gamma correction which effectively removes that response or modification. After the gamma correction, the image is back to its original state. The gamma correction transformation may be device specific.

The first gamma value (γ) and parameters for the subsequent transformations are contained in the PIM header. Accordingly, step S44 is followed by step S46A where the first transformation (H1(x)) is calculated according to equation Eq.(2)

$$y = H1(x) \quad \text{Eq.(2)}$$

Step S46A is followed by the intermediate steps for calculating subsequent transformations up to transform N (HN(x)) at step S46N according to equation Eq.(3)

$$y = HN(x) \quad \text{Eq.(3)}$$

Step S46N is followed by step S48 where the rendering device (printer 35 or a display monitor) applies the display gamma according to equation Eq.(4)

$$x^{1/\gamma} \quad \text{Eq.(4)}$$

The steps S46A-S46N relate to the PIM parameters. In the exemplary embodiment, the transformations F1, F2, ... FN relate to the PIM parameters. For example, transformations F1, F2 and F3 can be for the highlight point setting, gamma correction and memory color settings, respectively. All other transformations F4-FN support additional PIM parameters.

It is well known that histogram equalization will produce an image that will exhibit the greatest dynamic range. However sometimes histogram equalization does not produce the desired contrast in the areas of interest (too dark image with small bright element or too bright image with a small dark element). In those cases histogram equalization is too aggressive (shift dark to grey in the first case and white to grey in the second case). Several methods have been used in an attempt to limit (CAP) the histogram equalization.

In the method 100, the function that is used to obtain the histogram equalization is averaged with no transformation (y=x) function with varying weights for the two functions.

The histogram equalization of a source X is performed as Y=T(X) where T( ) is the cumulative density function, defined according to equation Eq.(5) as $$H(x) = \sum_{k=0}^{x} h(k) \quad \text{Eq. (5)}$$

where h(k) is the component histogram; and x=0-255. The transform function (T(x)) used in this case is then obtained according to equation Eq.(6)

$$T(x) = H(x) + (1-\alpha)x/255 \quad \text{Eq.(6)}$$

where x=0-255; and a is chosen to be 2/3. The parameter "α" is for equalization aggressiveness within a range between 0 to 1 where if α=0 there is no equalization and if α=1 there is full equalization.

Figures 15A, 15B:
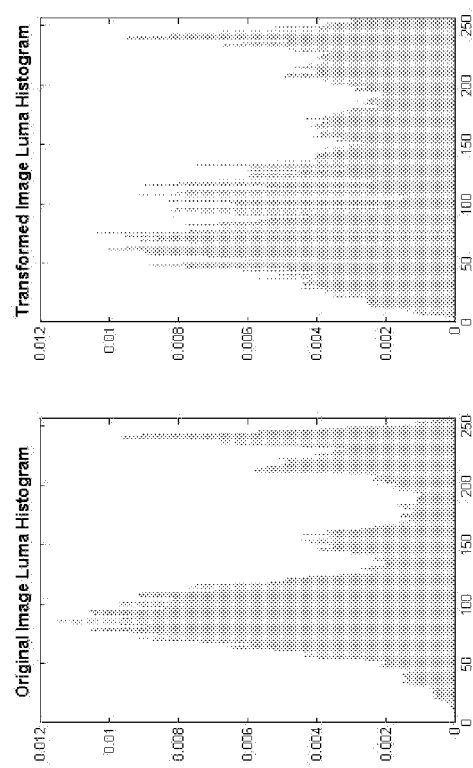
FIG. 15A illustrates a plot of an original image luma histogram.
FIG. 15B illustrates a plot of a transformed image luma histogram.

Referring also to FIGS. 15A and 15B, a luma histogram plot is shown on an image before and after the transformation for α equal to 2/3.

It is noted that although the goal is to histogram equalize a gamma corrected image, the processing is applied after gamma correction is removed (See Step S44). Accordingly, the following identities are presented.

In view of the foregoing, the histogram equalization process S101 begins at step S102 where the histogram h(i) of L' (gamma corrected luma) is computed. Step S102 is followed by step S104 where the cumulative density function H(i) is computed. Step S104 is followed by step S106 where the cumulative density function H(i) is applied according to equation Eq.(7)

$$H(i) = H((i/255^{1/2.2})*255) \quad \text{Eq.(7)}$$

where i varies from 0-255. Step S106 is followed by step S108 where the transform function (T(i)) is computed according to equation Eq.(6) rewritten (by substituting i or x) into equation (8)

$$T(i) = H(i) + (1-\alpha)i/255 \quad \text{Eq.(8)}$$

where i=0-255; and a is chosen to be 2/3. Step S108 is followed by step S110 where gamma γ is found that minimizes equation Eq.(9)

$$E[(T(i) - (i/255)^\gamma)^2] \quad \text{Eq.(9)}$$

where T(i) is the transfer function of equation Eq.(6). Step S110 is followed by step S112 where the difference between the transform function and the component to remove gamma is computed according to equation Eq.(10)

$$R(i) = T(i) - (i/255)^\gamma \quad \text{Eq.(10)}$$

where i=0-255 and where $i^\gamma$ is the means (raising to the power) to remove gamma.

Continuing to FIG. 12B, step S112 is followed by step S114 where the contrast C setting is computed according to equation Eq.(11)

$$C = 255 * \left( \sum_{i=0}^{128} R(i) - \sum_{i=129}^{255} R(i) \right) / 2 \qquad \text{Eq. (11)}$$

Step S114 is followed by step S116 where the brightness B setting is computed according to equation Eq.(12)

$$B = 255 * \sum_{i=0}^{255} R(i) / 2 \qquad \text{Eq. (12)}$$

Step S116 is followed by step S118 where the gamma correction value (γ) is computed according to equation Eq.(13)

$$\gamma = \gamma + 1.2 \qquad \text{Eq.(13)}$$

because γ=2.2 is equivalent to no additional gamma correction.

Step S118 is followed by step S120 where the gamma correction value is inserted in the PIM header.

Using the histogram equalization process S101, a sample of the inserted values in PIM header is shown in TABLE 1.

TABLE 1

| PIM Header Parameter | Inserted Value |
| --- | --- |
| Gamma Correction Value | 16 (1.6) |
| Contrast | −3 |
| Brightness | −5 |

The next batch of PIM parameters for improving print picture quality are: RGB color balance settings, highlight/shadow point setting, and memory colors correction setting. While not wishing to be bound by theory, it is concluded that the RGB color balance setting is an operation that is already performed on the image (white balance) via a matrix multiplication and addition. The exact same degrees of freedom are supported in PIM header which makes this correction unnecessary.

The shadow and highlight setting process S141 is basically a linear point-to-point mapping and is required when the image capturing device 12 or the wireless camera phone device 12' uses a RGB format that is other than [0:255]. Commonly, a wireless camera phone device may use a RGB format that is [19:238]. Other RGB formats may be used. Thus, the best use of the shadow and highlight setting process S141 is "stretching" the captured image if it is other than [0:255].

Referring now to FIG. 13, the shadow and highlight setting process S141 begins with step S142 where the gamma corrected R'G'B' format image is obtained having a range [P:Q]. Step S142 is followed by step S144 where the R'G'B' format image is converted to a linear RGB formatted image such as in the range [P':Q'] in accordance with equations Eq.(14A) and Eq. (14B).

$$P' = ((P/255)^\gamma) * 255 \qquad \text{Eq. (14A)}$$

$$Q' = ((Q/255)^\gamma) * 255 \qquad \text{Eq. (14B)}$$

where gamma (γ) is 2.2. Step S144 is followed by step S146 where the shadow point is set to P'. In step S148, the highlight point is set to 255-Q'. Thus, the image at step S148 has been effectively stretched to the range of [0:255].

Assume, the captured image or snapshot from wireless camera phone device 12' has a $_{219}$R'G'B' format (e.g. the gamma corrected RGB values lie [19:238]). When converted to a linear RGB format (removing gamma) the range is [1:219]. Therefore, the image can be stretched to [0:255] by setting shadow point to 1 and highlight point to 36. As can be appreciated, the shadow and highlight setting process S141 is only required for those devices which produce an image that requires stretching to [0:255].

The memory color saturation process S161, in general, modifies colors that lie within a certain range to obtain more vivid color representation for colors that are remembered when looked at (such as foliage green, sky blue, skin, water etc.). According to some psychophysical experiments, it has been found that the general public likes green, red, and blue to be saturated and flesh color untouched (flesh color is dependent on cultural preferences and that is the reason it is not modified).

Furthermore, the memory color saturation process S161 allows the memory colors to be modified independently in the PIM header. The modifiable memory colors include green, sky, blue, flesh color and red. However, the memory color saturation process S161 saturates green, sky, blue and red.

Referring now to FIGS. 14A-14C, the memory color saturation process S161 begins with step S162 where the R'G'B' are normalized according to equations Eq.(15A), (15B) and (15C).

$$R_n = \frac{R'}{R' + G' + B'} \qquad \text{Eq. (15A)}$$

$$G_n = \frac{G'}{R' + G' + B'} \qquad \text{Eq. (15B)}$$

$$B_n = \frac{B'}{R' + G' + B'} \qquad \text{Eq. (15C)}$$

Where $R_n$ represents the normalized value of red R'; $G_n$ represents the normalized value of green G'; and $B_n$ represents the normalized value of blue B'. R'G'B' indicates that the image in a RGB format has been subjected to gamma correction.

Step S162 is followed by step S164 where the mean color value or average of the R'G'B' is computed around the color of interest (the actual color coordinate for green, blue, and red are given below and are subject to normalization). Steps S164 is followed by step S166 where a determination is made regarding equation Eq.(16) defined as $$(R_{In} - R_{In})^2 + (G_{In} - G_{In})^2 < K^2 \qquad \text{Eq.(16)}$$

where $R_{In}$, and $G_{In}$ are the normalized color of interest components. The value of K is chosen to be 20 for green and red and 12 for sky blue because there are less color variations in the sky color.

If the determination at step S166 is "YES," the process continues to step S168 where a point is added to the average or mean color value (R'G'B'). However, if the determination at step S166 is "NO," step S166 is followed by step S170. Step S168 is also followed by step S170 where the gamma correction is removed from the average or mean color value denoted as $R_{AVG}G_{AVG}B_{AVG}$.

Step S170 is followed by step S172 where the mean color value $R_{AVG}G_{AVG}B_{AVG}$ is transformed into hue (H), saturation (S) and intensity (I) space (hereinafter referred to as "HSI space") according to equation Eq.(17)

$$\theta = \cos^{-1}\frac{1/2[(R_{AVG}-G_{AVG})+(R_{AVG}-G_{AVG})]}{[(R_{AVG}-G_{AVG})^2+(R_{AVG}-B_{AVG})(G_{AVG}-B_{AVG})]^{1/2}} \quad \text{Eq. (17)}$$

where θ is a memory transformation angle.

Step S172 is followed by step S174 where if the condition $B_{AVG}<=G_{AVG}$ is true, then the step S174 is followed by step S176 where the hue (H) is defined as H=θ.

At step S174, if the condition $B_{AVG}<=G_{AVG}$ is not true then $B_{AVG}>G_{AVG}$. Hence, Step S174 is followed by step S178 where the hue (H) is defined as H=360−θ.

Steps S176 and S178 are followed by step S180 where the saturation (S) is computed in accordance with equation Eq. (18)

$$S = 1 - \frac{2}{R_{AVB}+G_{AVG}+B_{AVG}}\min(R_{AVG}, G_{AVG}, B_{AVG}) \quad \text{Eq. (18)}$$

Step S180 is followed by step S182 where I is computed in accordance with equation Eq.(19)

$$I=1/3(R_{AVG}+G_{AVG}+B_{AVG}) \quad \text{Eq.(19)}$$

Step S182 is followed by step S184 where the saturation S is increased by a percentage or fraction (α) without exceeding a maximum saturation of 1. More specifically, at accordance with equation Eq.(20)

$$S=(1+\alpha)S \quad \text{Eq.(20)}$$

subject to S<=1 and 0<α<1.

Step S184 is followed by the process to transform the HSI space back to RGB space as set forth in FIG. 15C.

Referring now to FIG. 15C, steps S186A, 186B and 186C are shown following step S184. At step S186A, a determination is made whether the condition 0<=H<120 is met. If the determination is "YES", the transformation process from HSI space to RGB space is defined by equations Eq. (20A), (20B) and (20C)

$$B_O = I(1-S) \quad \text{Eq. (20A)}$$

$$R_O = I\left[1+\frac{S\cos(H)}{\cos(60-H)}\right] \quad \text{Eq. (20B)}$$

$$G_O = 3I - R_O - B_O \quad \text{Eq. (20C)}$$

where equation Eq.(20A) is the transformation for blue $B_O$ and is computed at step S190A; Eq.(20B) is the transformation for red $R_O$ and is computed at step S192A; and Eq.(20C) is the transformation for green $G_O$ and is computed at step S194A. The subscript "O" is used to denote an output.

At step S186B, if the condition 120<=H<240 is true, the transformation process from HSI space to RGB space is defined by equations Eq. (21A), (21B), (21C) and (21D)

$$H = H - 120 \quad \text{Eq. (21A)}$$

$$R_O = I(1-S) \quad \text{Eq. (21B)}$$

$$G_O = I\left[1+\frac{S\cos(H)}{\cos(60-H)}\right] \quad \text{Eq. (21C)}$$

$$B_O = 3I - R_O - G_O \quad \text{Eq. (21D)}$$

where equation Eq.(21A) offsets the hue (H) by 120 at step S188B; equation Eq.(21B) is the transformation for red $R_O$ computed at step S190B; equation Eq.(21C) is the transformation for green $G_O$ computed at step S192B; and equation Eq.(21D) is the transformation for blue $B_O$ computed at step S194B.

At step S186C, if 240<=H<360 is true, the transformation process from HSI space to RGB space is defined by equations Eq. (22A), (22B), (22C) and (22D)

$$H = H - 240 \quad \text{Eq. (22A)}$$

$$G_O = I(1-S) \quad \text{Eq. (22B)}$$

$$B_O = I\left[1+\frac{S\cos(H)}{\cos(60-H)}\right] \quad \text{Eq. (22C)}$$

$$R_O = 3I - B_O - G_O \quad \text{Eq. (22D)}$$

where equation Eq.(22A) offsets the hue (H) by 240 at step S188C; equation Eq.(22B) is the transformation for green $G_O$ computed at step S190C; equation Eq.(22C) is the transformation for blue $B_O$ computed at step S192C; and equation Eq.(22D) is the transformation for red $R_O$ computed at step S194C.

The saturated mean color difference is the difference between the input RGB which is represented by R'G'B' and the output RGB or $R_O G_O B_O$.

The values for the center points for green, blue, and red are given in TABLE 2 below:

TABLE 2

|  | R | G | B |
|---|---|---|---|
| Green | 160 | 190 | 60 |
| Blue | 96 | 124 | 159 |
| Red | 179 | 47 | 58 | and are normalized to (R+G+B=255) in TABLE 3 below:

TABLE 3

|  | R | G | B |
|---|---|---|---|
| Green | 100 | 118 | 37 |
| Blue | 65 | 83 | 107 |
| Red | 161 | 42 | 52 |

The application of memory colors adjustment with following parameters is shown below in TABLE 4.

TABLE 4

|  | Green | Sky Blue |
|---|---|---|
| Red | 2 | −15 |
| Green | 2 | −6 |
| Blue | −27 | 21 |

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A system comprising:
   an image capturing device for capturing an original image and extracting print image matching (PIM) parameter data automatically based on specifics of the original image;
   a rendering device which is PIM-enabled; and
   a processor for:
   receiving a gamma corrected version of the original image,
   removing the gamma correction to obtain the original image,
   calculating automatically at least one automated PIM parameter from the PIM parameter data, and
   inserting the at least one automated PIM parameter in PIM header information for communication to the rendering device to modify the original image when rendered,
   wherein calculating automatically comprises generating a transformation of the original image, the transformation based upon a histogram equalization process, a shadow setting process, and a memory color saturation process.

2. The system of claim 1, wherein the image capturing device is one of a wireless camera phone device, a digital camera, and a still image capturing assembly.

3. The system of claim 2, wherein the rendering device is a printer.

4. The system of claim 1, wherein the at least one automated PIM parameter data includes at least one of a brightness, contrast, gamma value and a memory color saturation setting.

5. The system of claim 4, wherein the processor calculates a cumulative density function H(i) for a histogram component which is defined as $$H(i)=H^{1/2.2}(i);$$

calculates a transform function T(i) defined as $$T(i)=H(i)+(1-\alpha)i/255$$

wherein $\alpha$ is 2/3 and i has a range of 0-255;
calculates a gamma value ($\gamma$) that minimizes $$E[(T(i)-i^\gamma)^2]; \text{ and}$$

calculates a difference R(i) between the transform function (T(i)) and a component to remove gamma ($i^\gamma$) according to $$R(i)=T(i)-i^\gamma.$$

6. The system of claim 5, wherein the contrast setting (C) is calculated according to $$C = \left(\sum_{i=0}^{128} R(i) - \sum_{i=129}^{255} R(i)\right)/2$$

the brightness (B) setting is calculated according to $$B = \sum_{i=0}^{255} R(i)/2;$$

and
the gamma value setting is calculated according to $$\gamma=\gamma+1.2.$$

7. The system of claim 4, wherein the at least one automated PIM parameter includes a shadow and highlight point setting to stretch the original image when the original image has a red, green and blue (RGB) format range which is less than 0:255.

8. The system of claim 7, wherein the original image is a gamma corrected (R'G'B') format image having a range P:Q, the processor converts the R'G'B' format image to a linear (RGB) formatted image having a stretched range P':Q' in accordance with $$P'=((P/255)^\gamma)*255$$

and $$Q'=((Q/255)^\gamma)*255$$

where the gamma value setting ($\gamma$) is 2.2; P' is the shadow point setting; and 255-Q' is the highlight point setting.

9. The system of claim 4, wherein when the processor calculates the memory color saturation setting, the processor calculates independently red, green and blue colors.

10. The system of claim 9, wherein the processor further calculates independently a sky blue color.

11. The system of claim 4, wherein when the processor calculates the memory color saturation setting, the processor calculates normalized red (R), green (G) and blue (B) space color values, calculates red, green and blue mean ($R_{AVG}$, $B_{AVG}$ and $G_{AVG}$) color values in a circle around a reference circle, converts the $R_{AVG}$, $B_{AVG}$ and $G_{AVG}$ color values to hue, saturation, brightness space (HSI space), increases saturation (S) by a percentage without exceeding a maximum saturation, and converts the HSI space to output red, green, blue ($R_O$, $G_O$, $B_O$) space output color values.

12. The system of claim 11, wherein when the processor converts the $R_{AVG}$, $B_{AVG}$ and $G_{AVG}$ color values to the HSI space, the processor calculates a transformation angle $\theta$ defined by $$\theta = \cos^{-1}\frac{1/2[(R_{AVG}-G_{AVG})+(R_{AVG}-G_{AVG})]}{[(R_{AVG}-G_{AVG})^2+(R_{AVG}-B_{AVG})(G_{AVG}-B_{AVG})]^{1/2}}$$

wherein if the $B_{AVG}$ color value <=the $G_{AVG}$ color value, hue (H) is calculated as $$H=\theta$$

where if the $B_{AVG}$ color value >the $G_{AVG}$ color value, the hue (H) is calculated as $$H=360-\theta$$

where the saturation (S) is calculated as $$S = 1 - \frac{2}{R_{AVG}+G_{AVG}+B_{AVG}}\min(R_{AVG}, G_{AVG}, B_{AVG});$$

and
where brightness (I) is calculated as $$I=1/3(R_{AVG}+G_{AVG}+B_{AVG}).$$

13. The system of claim 12, wherein when the processor increases the saturation, the saturation (S) is increased according to $$S=(1+\alpha)S$$

subject to S<=1 and $0\leq\alpha\leq1$.

14. The system of claim 13, wherein when the processor converts the HSI space to the $R_O$, $G_O$, $B_O$ space output color values, the processor determines a range of the hue (H) wherein if the hue (H) is in the range of 0<=H<120, the $R_O$, $G_O$, $B_O$ space output color values are calculated as $$B_O = I(1-S),$$
$$R_O = I\left[1 + \frac{S\cos(H)}{\cos(60-H)}\right]$$

and $$G_O = 3I - R_O - B_O;$$

wherein if the hue (H) is in the range of 120<=H<240, the $R_O$, $G_O$, $B_O$ space output color values are calculated as $$H = H - 120,$$
$$R_O = I(1-S),$$
$$G_O = I\left[1 + \frac{S\cos(H)}{\cos(60-H)}\right]$$

and $$B_O = 3I - R_O - G_O;$$

wherein if the hue (H) is in the range of If 240<=H<360, the $R_O$, $G_O$, $B_O$ space output color values are calculated as $$H = H - 240,$$
$$G_O = I(1-S),$$
$$B_O = I\left[1 + \frac{S\cos(H)}{\cos(60-H)}\right] \text{ and}$$
$$R_O = 3I - B_O - G_O.$$

15. The system of claim 1, wherein the image capturing device inserts the PIM parameter data automatically in a header slot of a header appended to the original image and creates an image data file with the header and the original image.

16. The system of claim 15, wherein the image capturing device communicates the image data file to the processor.

17. An apparatus comprising:
a processor for:
receiving a gamma corrected version of an original image,
removing the gamma correction to obtain the original image,
calculating automatically at least one automated print image matching (PIM) parameter based on automatically extracted PIM parameter data based on specifics of the original image, and
inserting the at least one automated PIM parameter in PIM header information for communication to a PIM-enabled rendering device to modify the original image when rendered,
wherein calculating automatically comprises generating a transformation of the original image, the transformation based upon a histogram equalization process, a shadow setting process, and a memory color saturation process; and a memory coupled to the processor.

18. The apparatus of claim 17, wherein the at least one automated PIM parameter includes brightness, contrast and gamma value settings and a memory color saturation setting.

19. The apparatus of claim 18, wherein the processor calculates a cumulative density function H(i) for a histogram component which is defined as $$H(i) = H^{1/2.2}(i);$$

calculates a transform function T(i) defined as $$T(i) = H(i) \pm (1-\alpha)i/255$$

wherein α is 2/3 and i has a range of 0-255;
calculates a gamma value (γ) that minimizes $$E[(T(i) - i^\gamma)^2]; \text{ and}$$

calculates a difference R(i) between the transform function (T(i)) and a component to remove gamma ($i^\gamma$) according to $$R(i) = T(i) - i^\gamma.$$

20. The apparatus of claim 19, wherein the contrast setting (C) is calculated according to $$C = \left(\sum_{i=0}^{128} R(i) - \sum_{i=129}^{255} R(i)\right) / 2$$

the brightness (B) setting is calculated according to B=i=0 255 R (i)/2;

$$B = \sum_{i=0}^{255} R(i)/2;$$

and
the gamma value setting is calculated according to $$\gamma = \gamma + 1.2.$$

21. The apparatus of claim 18, wherein the at least one automated PIM parameter includes a shadow and highlight point setting to stretch the original image when the original image has a red, green and blue (RGB) format range which is less than 0:255.

22. The apparatus of claim 21, wherein the original image is a gamma corrected (R'G'B') format image having a range P:Q, the processor converts the R'G'B' format image to a linear (RGB) formatted image having a stretched range P':Q' in accordance with $$P' = ((P/255)^\gamma) * 255$$

and $$Q' = ((Q/255)^\gamma) * 255$$

where the gamma value setting (γ) is 2.2; P' is the shadow point setting; and 255-Q' is the highlight point setting.

23. The apparatus of claim 18, wherein when the process calculates the memory color saturation setting, the processor calculates independently red, green and blue colors.

24. The apparatus of claim 23, wherein the processor further calculates independently a sky blue color.

25. The apparatus of claim 18, wherein when the processor calculates the memory color saturation setting, the processor calculates normalized red (R), green (G) and blue (B) space color values, calculates red, green and blue mean ($R_{AVG}$, $B_{AVG}$ and $G_{AVG}$) color values in a circle around a reference circle, converts the $R_{AVG}$, $B_{AVG}$ and $G_{AVG}$ color values to hue, saturation, brightness space (HSI space), increases saturation (S) by a percentage without exceeding a maximum saturation, and converts the HSI space to output red, green, blue ($R_O$, $G_O$, $B_O$) space output color values.

26. The apparatus of claim 25, wherein when the processor converts the $R_{AVG}$, $B_{AVG}$ and $G_{AVG}$ color values to the HSI space, the processor calculates a transformation angle θ defined by $$\theta = \cos^{-1} \frac{1/2[(R_{AVG} - G_{AVG}) + (R_{AVG} - G_{AVG})]}{[(R_{AVG} - G_{AVG})^2 + (R_{AVG} - B_{AVG})(G_{AVG} - B_{AVG})]^{1/2}}$$

wherein if the $B_{AVG}$ color value <= the $G_{AVG}$ color value, hue (H) is calculated as $$H = \theta$$

where if the $B_{AVG}$ color value > the $G_{AVG}$ color value, the hue (H) is calculated as $$H = 360 - \theta$$

where the saturation (S) is calculated as $$S = 1 - \frac{2}{R_{AVG} + G_{AVG} + B_{AVG}} \min(R_{AVG}, G_{AVG}, B_{AVG});$$

and
where brightness (I) is calculated as $$I = 1/3(R_{AVG} + G_{AVG} + B_{AVG}).$$

27. The apparatus of claim 26, wherein when the processor increases the saturation, the saturation (S) is increased according to $$S = (1 + \alpha)S$$

subject to S<=1 and 0<.alpha.<1.

28. The apparatus of claim 27, wherein when the processor converts the HSI space to the $R_O$, $G_O$, $B_O$ space output color values, the processor determines a range of the hue (H) wherein if the hue (H) is in the range of 0<=H<120, the $R_O$, $G_O$, $B_O$ space output color values are calculated as $$B_O = I(1 - S),$$
$$R_O = I\left[1 + \frac{S\cos(H)}{\cos(60 - H)}\right] \text{ and}$$
$$G_O = 3I - R_O - B_O;$$

wherein if the hue (H) is in the range of 120<=H<240, the $R_O$, $G_O$, $B_O$ space output color values are calculated as $$H = H - 120,$$
$$R_O = I(1 - S),$$
$$G_O = I\left[1 + \frac{S\cos(H)}{\cos(60 - H)}\right] \text{ and}$$
$$B_O = 3I - R_O - G_O;$$

wherein if the hue (H) is in the range of If 240<=H<360, the $R_O$, $G_O$, $B_O$ space output color values are calculated as $$H = H - 240,$$
$$G_O = I(1 - S),$$
$$B_O = I\left[1 + \frac{S\cos(H)}{\cos(60 - H)}\right] \text{ and}$$
$$R_O = 3I - B_O - G_O.$$

29. The apparatus of claim 17, wherein the apparatus comprises a general purpose computing device.

30. The apparatus of claim 29, wherein the general purpose computing device comprises a computer.

31. A computer program product including a non-transitory computer readable medium having instructions for causing a computer to:
receiving a gamma corrected version of the original image;
removing the gamma correction to obtain the original image;
calculate automatically at least one automated print image matching (PIM) parameter based on automatically extracted PIM parameter data from specifics of the original image, wherein the calculating automatically comprises generating a transformation of the original image, the transformation based upon a histogram equalization process, a shadow setting process, and a memory color saturation process; and
insert the at least one automated PIM parameter in PIM header information for communication to a PIM-enabled rendering device to modify the original image when rendered.

32. The computer program product of claim 31, wherein the at least one automated PIM parameter includes brightness, contrast and gamma value settings and a memory color saturation setting.

33. The computer program product of claim 32, wherein the instructions to calculate the brightness, contrast and gamma value settings, includes instructions to calculate a cumulative density function H(i) for a histogram component which is defined as $$H(i)H^{1/2.2}(i);$$

calculates a transform function T(i) defined as $$T(i) = H(i) \pm (1-\alpha)i/255$$

wherein α is 2/3 and i has a range of 0-255;
calculates a gamma value (γ) that minimizes $$E[(T(i) - i^\gamma)^2]; \text{ and}$$

calculates a difference R(i) between the transform function (T(i)) and a component to remove gamma ($i^\gamma$) according to $$R(i) = T(i) - i^\gamma.$$

34. The computer program product of claim 33, wherein the instructions to calculate the contrast setting (C), includes instruction to calculate the contrast setting (C) according to $$C = \left(\sum_{i=0}^{128} R(i) - \sum_{i=129}^{255} R(i)\right) / 2$$

the brightness (B) setting is calculated according to B=i=0 255 R (i)/2;

$$B = \sum_{i=0}^{255} R(i)/2;$$

and
the gamma value setting is calculated according to $\gamma = \gamma + 1.2$.

35. The computer program product of claim 32, wherein the at least one automated PIM parameter includes a shadow and highlight point setting to stretch the original image when the original image has a red, green and blue (RGB) format range which is less than 0:255.

36. The computer program product of claim 35, wherein the original image is a gamma corrected (R'G'B') format image having a range P:Q, the instructions to calculate the shadow and highlight point setting includes instructions to convert the R'G'B' format image to a linear (RGB) formatted image having a stretched range P':Q' in accordance with $P' = ((P/255)^\gamma) * 255$ and $Q' = ((Q/255)^\gamma) * 255$ where the gamma value setting ($\gamma$) is 2.2; P' is the shadow point setting; and 255-Q' is the highlight point setting.

37. The computer program product of claim 32, wherein the instructions to calculate the memory color saturation setting, includes instructions to calculate independently red, green and blue colors.

38. The computer program product of claim 32, wherein the instructions to calculate the memory color saturation setting, includes instructions to calculate normalized red (R), green (G) and blue (B) space color values, calculates red, green and blue mean ($R_{AVG}$, $B_{AVG}$ and $G_{AVG}$) color values in a circle around a reference circle, converts the $R_{AVG}$, $B_{AVG}$ and $G_{AVG}$ color values to hue, saturation, brightness space (HSI space), increases saturation (S) by a percentage without exceeding a maximum saturation, and converts the HSI space to output red, green, blue ($R_O$, $G_O$, $B_O$) space output color values.

39. The computer program product of claim 38, wherein the instruction to convert the $R_{AVG}$, $B_{AVG}$ and $G_{AVG}$ color values to the HSI space, includes instructions to calculate a transformation angle $\theta$ defined by $$\theta = \cos^{-1} \frac{1/2[(R_{AVG} - G_{AVG}) + (R_{AVG} - G_{AVG})]}{[(R_{AVG} - G_{AVG})^2 + (R_{AVG} - B_{AVG})(G_{AVG} - B_{AVG})]^{1/2}}$$

wherein if the $B_{AVG}$ color value <= the $G_{AVG}$ color value, hue (H) is calculated as $H = \theta$ where if the $B_{AVG}$ color value > the $G_{AVG}$ color value, the hue (H) is calculated as $H = 360 - \theta$ where the saturation (S) is calculated as $$S = 1 - \frac{2}{R_{AVG} + G_{AVG} + B_{AVG}} \min(R_{AVG}, G_{AVG}, B_{AVG});$$

and where brightness (I) is calculated as $I = 1/3(R_{AVG} + G_{AVG} + B_{AVG})$.

40. The computer program product of claim 39, wherein the instructions to increase the saturation, increases the saturation (S) according to $S = (1+\alpha)S$ subject to $S \le 1$ and $0 \le \alpha \le 1$.

41. The computer program product of claim 40, wherein the instructions to convert the HSI space to the $R_O$, $G_O$, $B_O$ space output color values, includes instructions to determine a range of the hue (H) wherein if the hue (H) is in the range of $0 <= H < 120$, the $R_O$, $G_O$, $B_O$ space output color values are calculated according to $$B_O = I(1 - S),$$
$$R_O = I\left[1 + \frac{S\cos(H)}{\cos(60 - H)}\right] \text{ and}$$
$$G_O = 3I - R_O - B_O;$$

wherein if the hue (H) is in the range of $120 <= H < 240$, the $R_O$, $G_O$, $B_O$ space output color values are calculated as $$H = H - 120,$$
$$R_O = I(1 - S),$$
$$G_O = I\left[1 + \frac{S\cos(H)}{\cos(60 - H)}\right] \text{ and}$$
$$B_O = 3I - R_O - G_O;$$

wherein if the hue (H) is in the range of If $240 <= H < 360$, the $R_O$, $G_O$, $B_O$ space output color values are calculated according to $$H = H - 240,$$
$$G_O = I(1 - S),$$
$$B_O = I\left[1 + \frac{S\cos(H)}{\cos(60 - H)}\right] \text{ and}$$
$$R_O = 3I - B_O - G_O.$$

42. A wireless device comprising:
an image capturing module for capturing an original image;
a processor for:
receiving a gamma corrected version of the original image,
removing the gamma correction to obtain the original image,
automatically extracting print image matching (PIM) parameter data automatically based on specifics of the original image,
inserting the PIM parameter data in a header slot of a header appended to the original image, and
creating an image data file with the header and the original image, wherein the automatically extracting comprises generating a transformation based upon a histogram equalization process, a shadow setting process, and a memory color saturation process; and a communication module for communicating the image data file, the image data file being used to calculate automatically at least one automated PIM parameter.

43. A method comprising:

capturing an original image;

receiving a gamma corrected version of the original image;

removing the gamma correction to obtain the original image;

extracting print image matching (PIM) parameter data automatically based on specifics of the original image;

calculating automatically at least one automated PIM parameter from the PIM parameter data, wherein calculating automatically comprises generating a transformation based upon a histogram equalization process, a shadow setting process, and a memory color saturation process; and inserting the at least one automated PIM parameter in PIM header information for communication to a rendering device to modify the original image when rendered.

44. The method of claim 43, wherein the calculating step includes calculating brightness, contrast and gamma value settings.

45. The method of claim 43, wherein the calculating step includes calculating a memory color saturation setting.

46. The method of claim 43, wherein the calculating step includes calculating a shadow and highlight point setting to stretch the original image when the original image has a red, green and blue (RGB) format range which is less than 0:255.

* * * * *